(12) United States Patent
Hazama (10) Patent No.: US 7,156,652 B2
(45) Date of Patent: Jan. 2, 2007

(54) MOTOR-DRIVEN INJECTION MOLDING APPARATUS

(75) Inventor: Syuuichi Hazama, Okazaki (JP)

(73) Assignee: Daiwa kasei Industry Co., Ltd., Aichi (JP)

( * ) Notice: Subject to any disclaimer, the term of this patent is extended or adjusted under 35 U.S.C. 154(b) by 217 days.

(21) Appl. No.: 10/677,319

(22) Filed: Oct. 3, 2003

(65) Prior Publication Data

US 2005/0074517 A1 Apr. 7, 2005

(51) Int. Cl.
B29C 45/66 (2006.01)

(52) U.S. Cl. .................... 425/567; 425/589; 425/451.7

(58) Field of Classification Search ............ 425/451.7, 425/567, 589, 590, 595
See application file for complete search history.

(56) References Cited

U.S. PATENT DOCUMENTS

| | | | | |
|---|---|---|---|---|
| 4,702,688 | A * | 10/1987 | Schenk ..................... | 425/451.7 |
| 4,984,980 | A * | 1/1991 | Ueno ......................... | 425/595 |
| 5,110,283 | A | 5/1992 | Bluml et al. | |
| 6,179,607 | B1 * | 1/2001 | Inaba et al. .............. | 425/451.7 |
| 6,186,770 | B1 * | 2/2001 | Ziv-Av ..................... | 425/451.7 |
| 6,537,057 | B1 * | 3/2003 | Tamaki et al. ............. | 425/595 |
| 6,561,785 | B1 * | 5/2003 | Morita et al. ............ | 425/451.7 |
| 6,682,338 | B1 * | 1/2004 | Maurilio ..................... | 425/567 |
| 6,793,482 | B1 * | 9/2004 | Kappelmuller et al. ..... | 425/574 |
| 6,821,463 | B1 * | 11/2004 | Di Dio et al. ........... | 425/451.7 |
| 6,851,942 | B1 * | 2/2005 | Wohlrab ................... | 425/451.7 |
| 2002/0176908 | A1 | 11/2002 | Yoshinaga et al. | |
| 2003/0017230 | A1 | 1/2003 | Yoshinaga et al. | |

FOREIGN PATENT DOCUMENTS

JP 2000-94488 4/2000

OTHER PUBLICATIONS

Patent Abstracts of Japan, vol. 2000, No. 07, Sep. 29, 2000 & JP 2000-094488 A (Daiwa Kasei Ind Co., Ltd., Apr. 4, 2000.
Patent Abstracts of Japan, vol. 2003, No. 08, Aug. 2003 & JP 2003-103590 A (Daiwa Kasei Ind Co., Ltd., Apr. 9, 2003.
Patent Abstracts of Japan, vol. 010, No. 234, Aug. 14, 1986 & JP 61-068219 A (Fanuc, Ltd.), Apr. 8, 1986.

* cited by examiner

Primary Examiner—James P. Mackey
(74) Attorney, Agent, or Firm—Townsend & Banta (57) ABSTRACT

The invention provides a motor-driven injection molding apparatus in which an entire of the apparatus is simplified and made compact. In a motor-driven injection molding apparatus (1), a movable metal mold (12) clamped to a stationary metal mold (11) is mounted to a movable mold plate (13), and two ball screws (17, 18) for moving the movable mold plate (13) are passed through two points on opposing corners of the movable mold plate (13). End portions of the ball screws (17, 18) are set in a cantilever state, and are rotated via pulleys (55, 55) and a timing belt (56), thereby moving the movable mold plate (13). Further, the movable mold plate (13) is guided by a slide guide having a structure that a bearing unit (14) fixed to both sides of a lower portion thereof is fitted to linear rails (15, 16). On the other hand, in an injection side, a injection side movable plate (33) to which an injection plunger (42) is fixed by two tie bars (35, 36) and two ball screws (37, 38) on respective opposing corners, and the same slide guides as mentioned above moves. The movable mold plate (13) is moved by the opening and closing side ball screws (17, 18) so as to be mold clamped, and the injection side movable plate (33) is thereafter moved so as to inject.

3 Claims, 10 Drawing Sheets

PRIOR ART

FIG.11B

PRIOR ART

MOTOR-DRIVEN INJECTION MOLDING APPARATUS

BACKGROUND OF THE INVENTION

1. Field of the Invention

The present invention relates to a motor-driven injection molding apparatus in which an electric motor opens and closes metal molds, injects a molten material, and unloads a molded product.

2. Description of the Related Art

In general, an injection molding machine is constituted by a metal mold opening and closing mechanism which opens and closes metal molds so as to clamp the mold, an injection mechanism which melts a pellet of a material to be molded or the like so as to inject, and a drive mechanism which automatically moves these mechanisms. The metal mold opening and closing mechanism is a mechanism which clamps the metal molds by a high pressure so as to carry out the mold clamping, and a mold clamping type thereof is broadly divided into a toggle type which opens and closes the metal molds and clamps the molds by a toggle mechanism, and a direct hydraulic type which directly clamps molds by a hydraulic cylinder or the like.

SUMMARY OF THE INVENTION

Figure 11A:
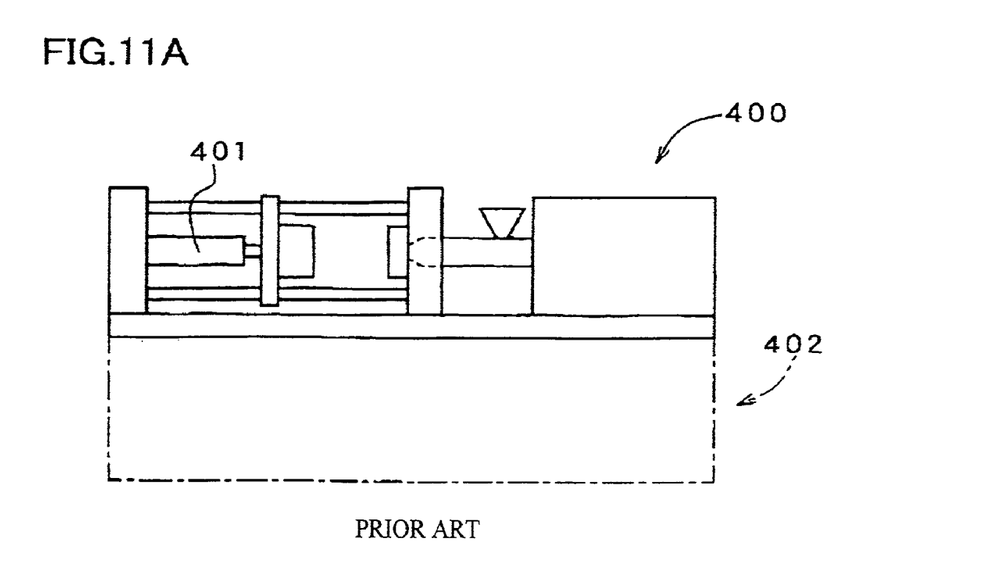
FIG. 11A is a front elevational view showing an embodiment of a conventional motor-driven injection molding apparatus.

In this case, the toggle type motor-driven injection molding apparatus can generate a high molding pressure by the toggle mechanism, however, since the mechanism requires a great space, most of the toggle type molding apparatuses are large-scaled. On the other hand, in a direct hydraulic type injection molding apparatus 400 using a hydraulic cylinder 401 shown in FIG. 11A, the apparatus itself becomes large-scaled due to a space for installing the hydraulic cylinder 401. Further, in the direct hydraulic type apparatus, there is known a motor-driven injection molding apparatus 300 having a structure in which the hydraulic cylinder 401 is replaced by a ball screw 301 shown in FIG. 11B. However, the direct hydraulic type motor-driven injection molding apparatus 300 using the ball screw 301 has the following defect. In this case, in FIGS. 11A and 11B, reference numerals 305 and 402 denote a frame supporting bed plate.

Figure 11B:
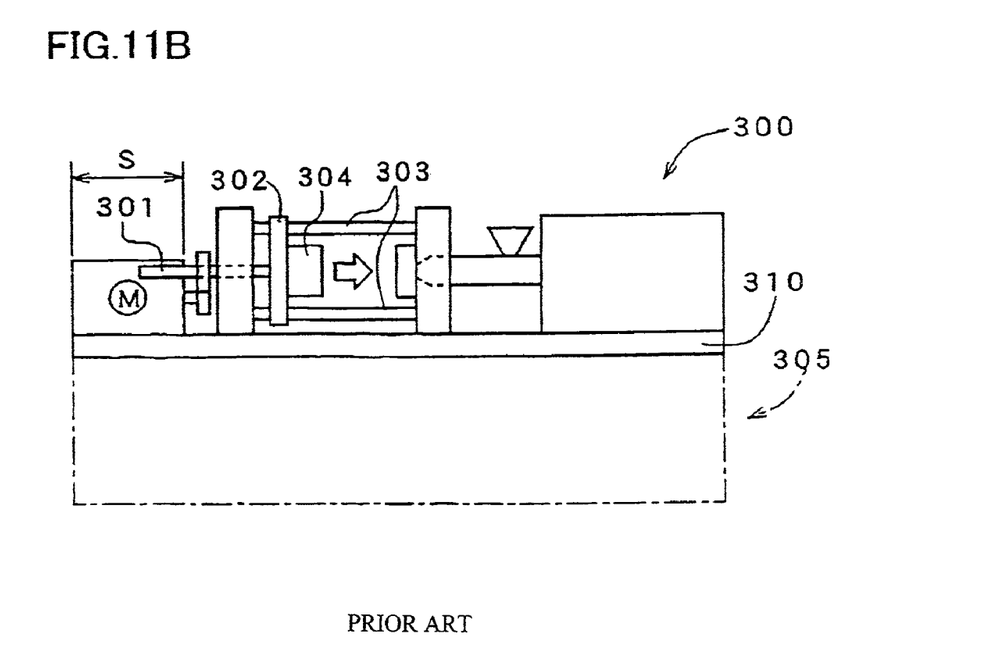
FIG. 11B is a view as continued from FIG. 11A.

In normal, four tie bars 303 (two of them are invisible in the shadow of the others) are provided in a die plate 302 arranged for opening and closing the metal mold, the die plate 302 moves along the tie bars 303 by pushing by the ball screw 301 so as to allow a metal mold 304 to open and close. Further, in the structure using the ball screw 301 mentioned above, since a space S for protruding the ball screw 301 from the opening and closing mechanism or the injection mechanism is required, the apparatus is large-scaled.

An object of the present invention is to provide a motor-driven injection molding apparatus in which an entire of the motor-driven injection molding apparatus can be made light weight and compact.

In order to achieve the object mentioned above, in accordance with the present invention, there is provided a motor-driven injection molding machine comprising:

a center fixed plate supporting a stationary mold of metal mold;

a movable mold plate movably arranged so as to approach to and deviate from the center fixed plate and supporting a movable mold of the metal molds;

a slide guide receiving a lower portion of the movable mold plate and slidably guiding the movable mold plate in the approaching and deviating directions;

ball screws extending in a cantilever state from the center fixed plate toward the movable mold plate, for example, two ball screws for opening and closing the mold, the ball screws engaging with the movable mold plate at two points on opposing corners of the movable mold plate;

an electric motor for opening and closing the mold, the electric motor rotating the ball screws in the cantilever state in both of forward and backward directions, and approaching the movable mold plate to the center fixed plate and deviating the movable mold plate from the center fixed plate; and an electric motor for injecting, the electric motor being arranged in an opposite side to the movable mold plate with respect to the center fixed plate in such a manner as to oppose to a mold opening and closing mechanism having the structure mentioned above, and driving a molten resin into the metal mold in a mold clamping state of the stationary mold and the movable mold with the approach of the movable mold plate to the stationary mold plate.

As mentioned above, since the movable mold plate is guided by the slide guide supporting the lower portion of the movable mold plate, and the conventional tie bars (the guide bars) are abolished, the number of the parts is reduced, the portion for passing the tie bars therethrough is not required in the movable mold plate, and only a suitable number of, for example, two ball screw on the opposing corners pass through the movable mold plate. Accordingly, it is possible to structure the movable mold plate compact, and the structure of the plate becomes simple.

Further, since the ball screw, for example, two ball screws passing through the movable mold plate are supported in the cantilever manner, an end plate for supporting an end portion of the ball screw is not required. Accordingly, since the number of the parts can be further reduced, and the end plate is abolished, the structure becomes simple. Further, since the space for arranging the end plate is not required, the apparatus is made more compact. In this case, since the ball screws in the cantilever state are rotated via a pulley or the like for moving the movable mold plate, the movable mold plate can carry out the mold opening and closing operation with no disadvantage. Further, since the ball screws are engaged with the movable mold plate in spite of being in the cantilever state, the ball screws can be received by the movable mold plate. Accordingly, the ball screws move the movable mold plate, and the movable mold plate supports the ends of the ball screws in the cantilever state so as to be interdependent, whereby the ball screws and the movable mold plate cooperatively achieve a simplification and a compact structure of the apparatus.

Further, as mentioned above, the number of the parts is reduced by abolishing the tie bars for guiding the ball screws and setting the ball screws in the cantilever state so as to abolish the end plate, so that the structure of the apparatus can be synergistically simplified and a compact structure can be achieved. As a result, an exclusive area for installation is reduced, and it is possible to increase the number of the motor-driven injection molding apparatuses which can be installed in a predetermined space.

Next, in the motor-driven injection molding apparatus having the structure mentioned above, in a mold clamping operation in the opening and closing mechanism, it is possible to detect a mold clamping stroke on the basis of a change in a load current value of the electric motor exclusive for the opening and closing mechanism. In this case, since no sensor for detecting a position of the movable mold plate or the like is used, it is possible to save labor of again positioning the sensor, even in the case that a thickness of the metal mold is changed.

On the other hand, the injection amount in the injection mechanism can be controlled on the basis of a signal output from a sensor for detecting a filling state of the material to be molded into the molding cavity of the metal mold. In this case, the sensor is provided within the metal mold so as to detect a filling amount of the material to be molded, and a suitable injection amount can be controlled on the basis of the signal. Accordingly, it is not necessary to use two sensors comprising the sensor for detecting the moving amount of the plunger or the like and the sensor for detecting the injection pressure, as is different from the conventional one, and a cost reduction can be achieved.

Further, in the injection mechanism, there can be provided in an injection tube with a plunger-in screw including a screw for mixing the material to be molded, the screw being rotatable at a fixed position in an axial direction of the injection tube, a receiving hole extending through on a center axis of the screw and storing the mixed molded material, and a plunger inserted through the receiving hole and injecting the mixed molded material. In this case, the screw melts the molded material to a temperature suitable for molding while instantaneously mixing the molded material, and thereafter, the plunger injects the mixed molded material to the metal mold by a suitable pressure. Accordingly, it is possible to rapidly and efficiently execute an injection process, and it is possible to make the injection mechanism compact in comparison with the normal screw type structure.

Further, two sets of injection mechanisms are provided so as to independently inject, two stationary metal molds are mounted to the center fixed plate in the mold opening and closing mechanism, and one movable metal mold is structured slidable in a perpendicular direction to the moving direction of the movable plate, at positions respectively fitted to two stationary metal molds by a slide mechanism, in the opening and closing side movable plate. A two-color molding can be carried out on the basis of the structure mentioned above. In other words, the two-color molding can be carried out even in the motor-driven injection molding apparatus in accordance with the present invention utilizing the rotation of the ball screw for the opening and closing mechanism, by mounting two stationary metal molds to the center fixed plate and achieving the structure mentioned above. In this case, as the slide mechanism of the movable metal mold, it is possible to use the same ball screw or the like as that of the movable plate.

In a combination of two sets of injection mechanisms mentioned above, two sets are set as a primary side and a secondary side, and the primary side and the secondary side can be selected from the following combinations in correspondence to the molded material to be used. The combinations include a combination that both of the primary side and the secondary side in the two-color molding are of the plunger type, a combination that one of the primary side and the secondary side is of the plunger type and the other is of the plunger-in screw type, and a combination that both of the primary side and the secondary side are of the plunger-in screw type.

The injection method is determined as toward the plunger type or toward the plunger-in screw type in accordance with the molded material, the shape of the target molded product, or the like. Since the plunger type has a lot of retention part at a time of injection, and has a great injection pressure loss, it is hard to inject a material having an inferior heat stability.

Accordingly, at a time of two-color molding, by combining the plunger type and the plunger-in screw type in correspondence to the molded material to be used as mentioned above, it is possible to efficiently advance the injection.

DESCRIPTION OF THE PREFERRED EMBODIMENT

A description will be given below of an embodiment in accordance with the present invention with reference to the accompanying drawings.

A motor-driven injection molding apparatus 1 (hereinafter, refer also to an apparatus) corresponding to an embodiment in accordance with the present invention shown in FIG. 1 has a frame 2 forming a base of the apparatus 1, a center fixed plate 3 provided in a center of the apparatus 1 and fixed to the frame 2 by a fixing portion 4, and a mold opening and closing mechanism portion 10 and an injection mechanism portion 30 separated on the border of the center fixed plate 3. Further, drive mechanism portions 50 and 50 for driving the mold opening and closing mechanism portion 10 and the injection mechanism portion 30 are provided in an inner portion of the frame 2 and in the periphery of the frame 2.

The mold opening and closing mechanism portion 10 is provided with the center fixed plate 3, and an opening and closing side movable plate 13 (a movable mold plate) arranged so as to approach to and deviate from the center fixed plate 3. Opening and closing side ball screws 17 and 18 are inserted through the movable mold plate 13 on opposing corners. These elements are structured as shown in FIG. 2 such that a threaded portion of the opening and closing side ball screw 18 is inserted through a nut 21 for the ball screw provided in the movable mold plate 13 by screwing (since another ball screw 17 has the same structure, the ball screw 18 is exemplified).

Figure 1:
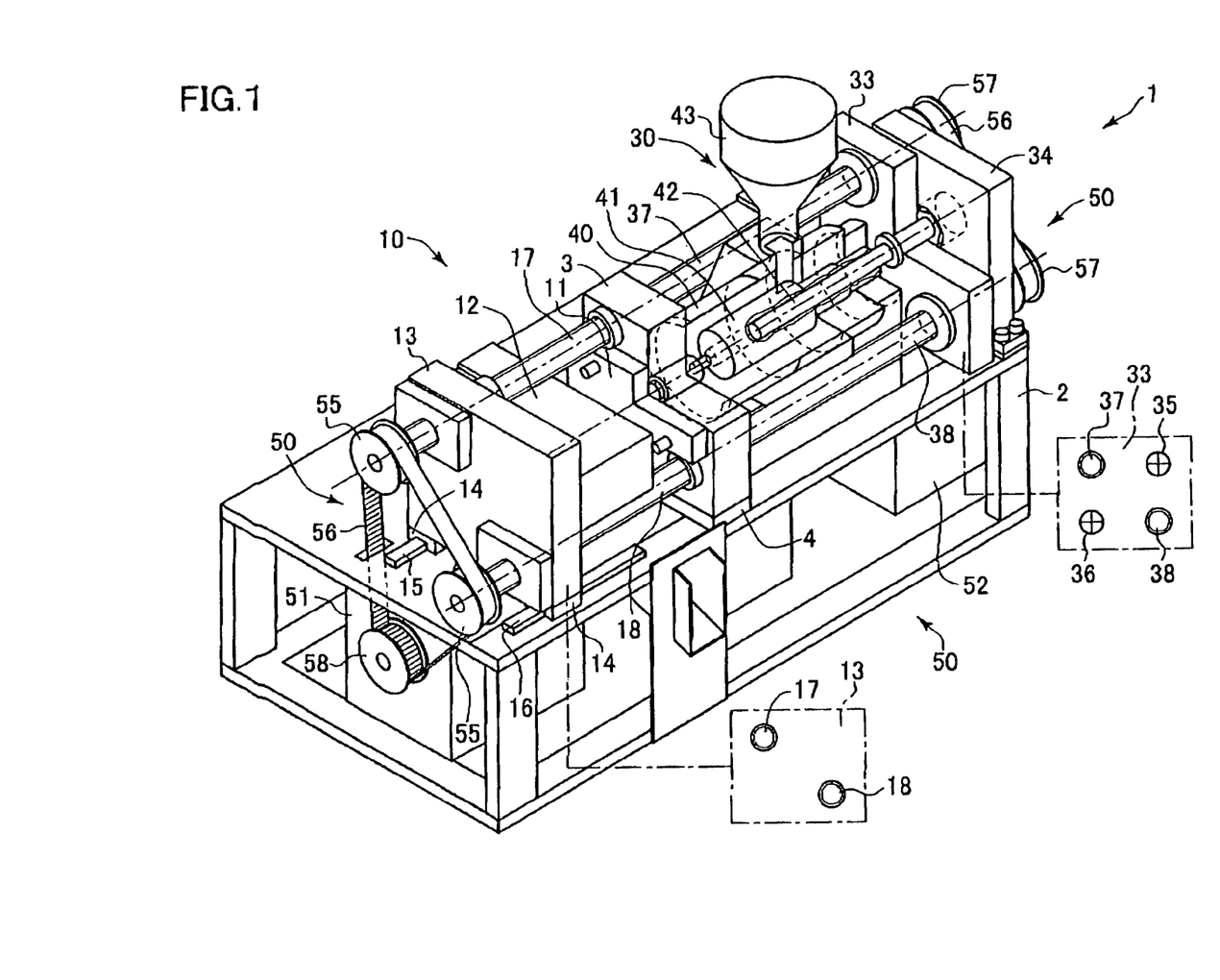
FIG. 1 is a partly notched perspective view of an embodiment of a motor-driven injection molding apparatus in accordance with the present invention.
Figure 2:
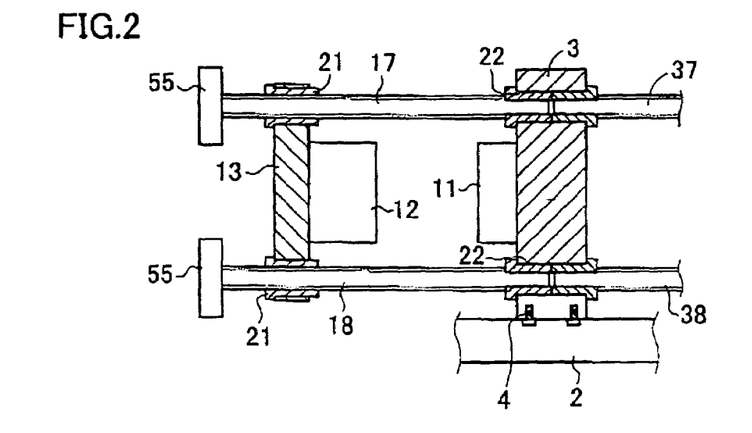
FIG. 2 is a partly enlarged cross sectional view showing an opening and closing mechanism portion in FIG. 1 in an enlarged manner.

Further, the opening and closing side ball screw 18 can be rotated by a opening and closing side motor 51 shown in FIG. 1 via a timing belt 56 and pulleys 55 and 55 serving as a transmission member, and the ball screw 18 is inserted through the center fixed plate 3 via a bearing 22 (FIG. 2). In this case, the opening and closing side ball screw 17 has the same structure. Both ball screws 17 and 18 are synchronously rotated in the same direction with each other via the timing belt 56 and the pulleys 55 and 55 by driving the motor 51, whereby the movable mold plate 13 is moved with respect to the center fixed plate 3.

The movable mold plate (the opening and closing side movable plate) 13 in the mold opening and closing mechanism 10 is slidably guided in a direction in which the movable mold plate 13 approaches to and deviates from the center fixed plate 3, by a slide guide. The slide guide is provided with two linear rails 15 and 16 arranged on an upper surface of the frame 2 along a moving direction of the movable mold plate 13 and being in parallel to each other, and bearing units 14 and 14 fixed to both sides of a lower portion of the movable mold plate 13, and is structured such that the respective bearing units 14 are fitted to the linear rails 15 and 16 so as to move on the rail.

Figure 3:
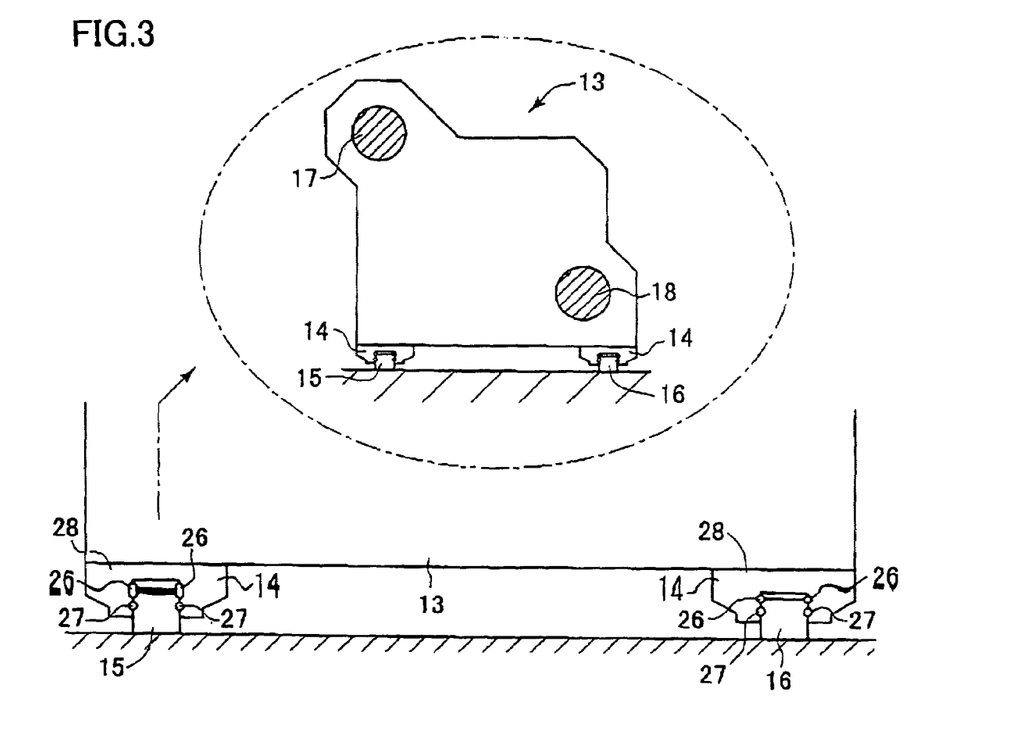
FIG. 3 is a front elevational view showing a slide guide of a movable mold plate.

As shown in FIG. 3, each of the bearing units 14 is provided with balls 26 and 26 rolling along upper ball grooves corresponding to both sides of the rail 15 or 16 so as to circulate, balls 27 and 27 rolling along lower ball grooves so as to circulate, and ball holders 28 and 28 holding the balls 26 and 27, a load of the movable mold plate 13 is received by the rails 15 and 16 via each of the balls 26 and 27, and each of the balls 26 and 27 roll so as to reduce a friction in correspondence to movement of the movable mold plate 13 on the rails 15 and 16.

As shown in FIG. 1, end portions of the ball screws 17 and 18 protruding to an outer side (an opposite side to the center fixed plate 3) from the movable mold plate 13 are not supported by an end plate, but is set in a cantilever state, so that the end portions are screwed with the movable mold plate 13 corresponding to a subject to be driven, thereby being supported. The pulley 55 mentioned above is mounted to the end portion in the cantilever state of each of the ball screws 17 and 18, the timing belt 56 driven by the motor 51 is wound around the pulleys 55 and 55, and two ball screws 17 and 18 rotated in the cantilever state move the movable mold plate 13. Each of the ball screws 17 and 18 extends through two points on the opposing corners of the movable mold plate 13, and the structure is made such that a driving force of the ball screws 17 and 18 is applied to the movable mold plate 13 as uniformly as possible. The motor 51 mentioned above is an electric motor for opening and closing the mold which rotates the ball screws 17 and 18 in the cantilever state in both of forward and backward directions so as to approach the movable mold plate 13 to the center fixed plate 3 and deviate the movable mold plate 13 from the center fixed plate 3.

Since no tie bar (no guide bar) guiding the movable mold plate 13 exists, it is not necessary to provide with the guided portion (through hole or the like) for the tie bar in the movable mold plate 13, and it is possible to make a shape of the movable mold plate 13 small. For example, as shown in FIG. 3, it is possible to achieve a compact shape obtained by deleting the portion (for example, a right upper portion of the plate 13) through which the tie bar conventionally extends. Since the guide bar is not provided, the end plate for supporting the end portion is not required. Although the ball screws 17 and 18 exist, the ball screws are driven in the cantilever state by abolishing the end plate for supporting the end portions of the ball screws, whereby it is possible to achieve an extremely simple and compact motor-driven injection molding apparatus in which the end plate and the guide bar are abolished.

A movable metal mold 12 is assembled in the movable mold plate 13, and a stationary metal mold 11 is assembled in the center fixed plate 3. The movable metal mold 12 moves together with the movable mold plate 13, a mold clamping between both the metal molds 11 and 12 is carried out with the approach of the movable mold plate 13, and a mold opening is carried out with the deviating of the movable mold plate 13.

As shown in FIG. 1, the injection mechanism portion 30 is provided with the center fixed plate 3, an injection side fixed plate 34, and an injection side movable plate 33 arranged between the center fixed plate 3 and the injection side fixed plate 34 and capable of moving in an axial direction. Further, through the injection side movable plate 33, there are inserted two injection side tie bars 35 and 36, and two injection side ball screws 37 and 38, on opposing corners. The injection side movable plate 33 is structured such as to move in an axial direction by rotation of the injection side ball screws 37 and 38 via pulleys 57 and 57 and the timing belt 56 by an injection side motor 52.

In this case, the structure may be made such that the injection side movable plate 33 is guided with respect to the frame 2, by the slide guide shown in FIGS. 1 and 3, that is, the rails 15 and 16 and the bearing units 14 and 14 assembled in the rails 15 and 16.

The plunger 42 for injecting the molded material (the resin) is fixed onto a center axis of the injection side movable plate 33, and a cylinder 41 coaxially provided with the plunger 42 and capable of receiving the plunger 42 is arranged approximately in a center of the injection mechanism portion 30. In other words, the injection mechanism portion 30 of the motor-driven injection molding apparatus 1 is structured by the plunger type. A hopper 43 for feeding the molded material to the injection mechanism portion 30 is provided above the cylinder 41, and a heater 40 for heating the molded material so as to form a molten body to be injected is provided in an outer peripheral portion of the cylinder 41. The plunger 42 is structured such as to repeat a reciprocating motion in correspondence to a movement of the injection side movable plate 33 in an axial direction.

In this case, the structure is made such that the molten material is injected to the mold opening and closing mechanism portion 10 from the injection mechanism 30 via the center fixed plate 3.

The drive mechanism portions 50 and 50 in both end portions of the apparatus 1 mentioned above are structured such that the opening and closing side motor 51 for driving the opening and closing side ball screws 17 and 18 of the opening and closing mechanism portion 10, and the injection side motor 52 for driving the injection side ball screws 37 and 38 of the injection mechanism portion 30 are fit in the inner portion of the frame 2.

A sensor for detecting a load current value of the drive is built in the opening and closing side motor 51. This sensor is provided for controlling a stroke for mold clamping in the opening and closing mechanism, and stops the driving of the motor 51 in the case that a predetermined load current value is obtained, by setting a load current value of the motor 51 in correspondence to the mold clamping pressure, thereby setting an injection preparation state.

Figure 4A:
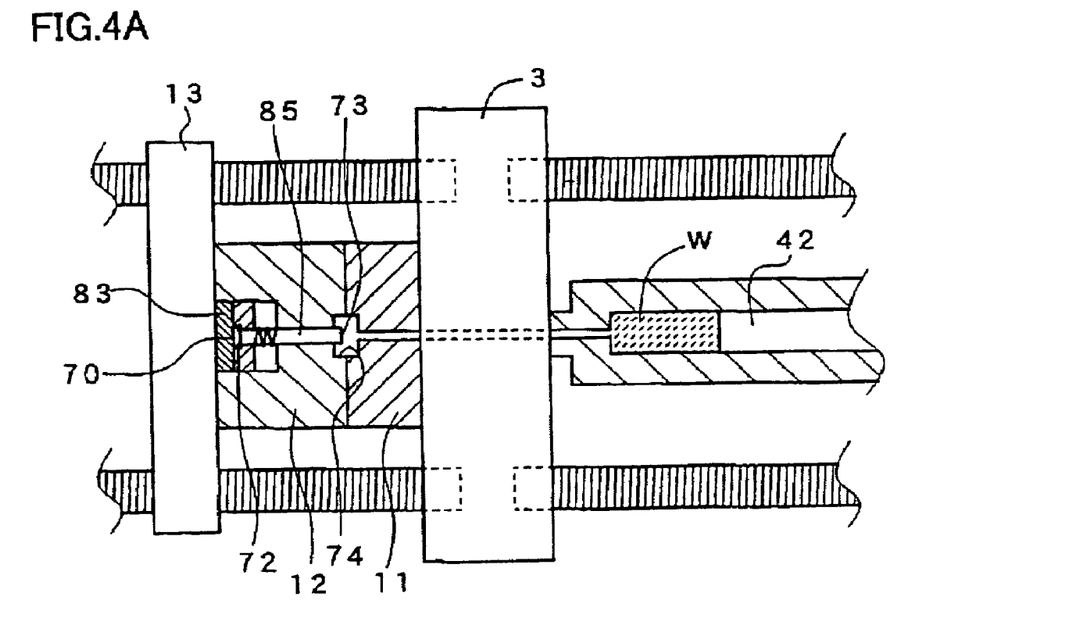
FIG. 4A is a view explaining a function of a sensor for controlling an injection amount.
Figure 4B:
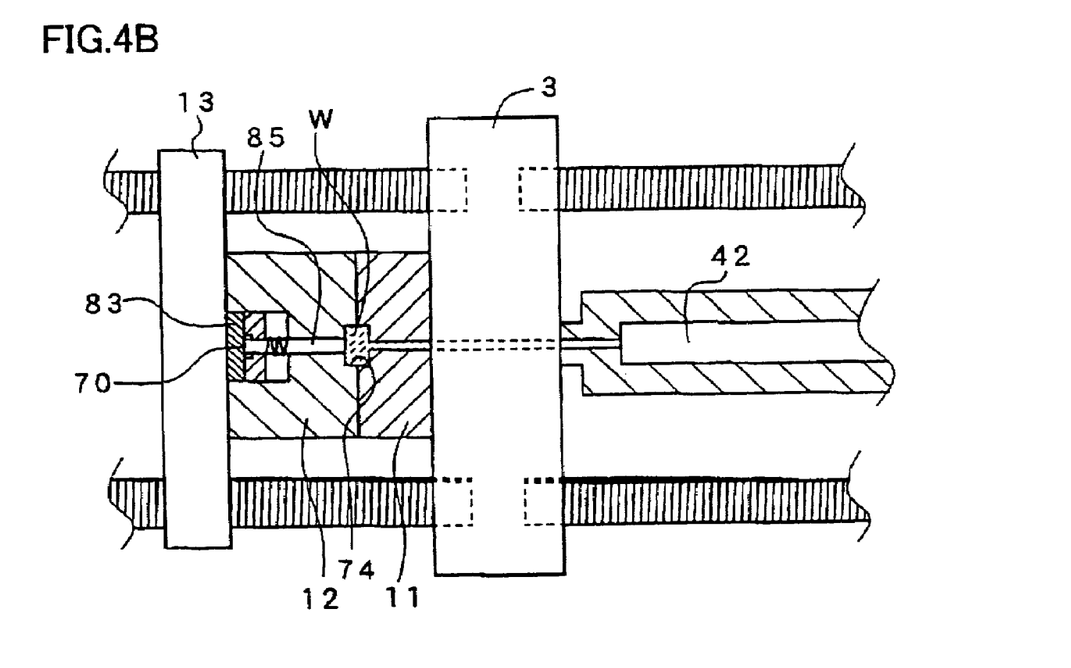
FIG. 4B is a view as continued from FIG. 4A.

As shown in FIG. 4, an ejector plate 83 within the movable metal mold 12 is provided with a sensor 70 for detecting a charging amount of a molded material W injected by the plunger 42. In other words, in a mold clamping state shown in FIG. 4A, since the molded material W has not been charged yet, a leading end 73 of a molded product protruding pin 85 is energized by a web spring 72 formed on an end surface of the sensor 70 so as to slightly protrude into the cavity 74. Next, as shown in FIG. 4B, when the molded product W is injected by the plunger 42 so as to be charged within the cavity 74, the molded product protruding pin 85 slightly moves on the basis of a pressure of the molded material W, and the web spring 72 is elastically deformed approximately in a flat plate shape so as to be brought into contact with the sensor 70. Further, the structure is made such that the injection amount is controlled by the injection side motor 52 (FIG. 1) on the basis of a signal of the contacted sensor 70.

A description will be given of a molding mechanism of the motor-driven injection molding apparatus 1 having the structure mentioned above from the mold clamping to the injection with reference to FIG. 5. In this case, FIG. 5 shows a simplified view in which the tie bars in the injection mechanism side are omitted and two ball screws are shown for the purpose of easy understanding.

Figure 5:
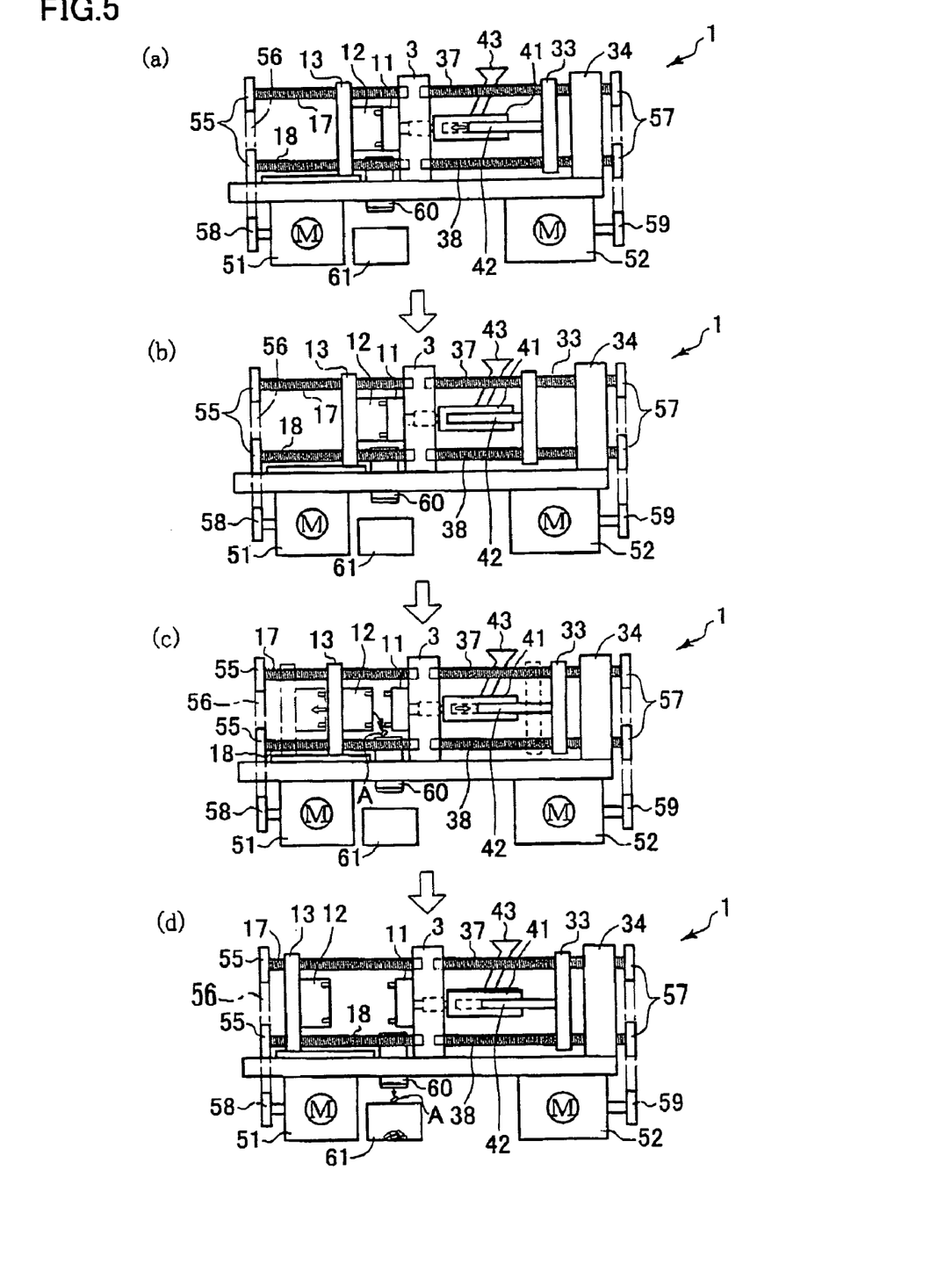
FIG. 5 is a view explaining an operation of the motor-driven injection molding apparatus in FIG. 1.

First, in the motor-driven injection molding apparatus 1 in a standby state shown in (d) of FIG. 5, the ball screws 17 and 18 rotate in accordance with the operation of the opening and closing side motor 51, whereby the movable mold plate 13 moves close to the center fixed plate 3, and the movable metal mold 12 becomes in a mold clamping state shown in (A) of FIG. 5 in accordance with the movement of the movable mold plate 13. This finish of mold clamping is detected by a matter that the load current value of the opening and closing side motor 51 reaches a predetermined value. Subsequently, under this state, the ball screws 37 and 38 are rotated by operating the injection side motor 52, whereby the injection side movable plate 33 moves toward the center fixed plate 3, and the plunger 42 moves close to the center fixed plate 3 in the same manner, thereby setting an injection state shown in (b) of FIG. 5.

In this case, the injection side movable plate 33 moves close to the center fixed plate 3 until the charging of the molded material into the cavity 74 (FIG. 4) is finished by the sensor 70 (FIG. 4) provided in the movable metal mold 12, thereby finishing the injection.

When the signal indicating the finish of charging is transmitted by the sensor 70, the injection side motor 52 reverses the driving direction, and the plunger 42 moves close to the injection side fixed plate 34 together with the injection side movable plate 33 as shown in (c) of FIG. 5, thereby setting a standby state. On the other hand, the opening and closing side motor 51 also reverses the driving direction at a time when a fixed keeping time has passed after injection, the movable metal mold 12 moves in the opening direction together with the movable mold plate 13, thereby setting a mold opening state shown in (c) of FIG. 5.

In this case, although an illustration is omitted in FIG. 5, the molded product A is removed from the cavity on the basis of a predetermined operation of an air cylinder and the molded product is collected from a collecting portion 60.

Figure 6:
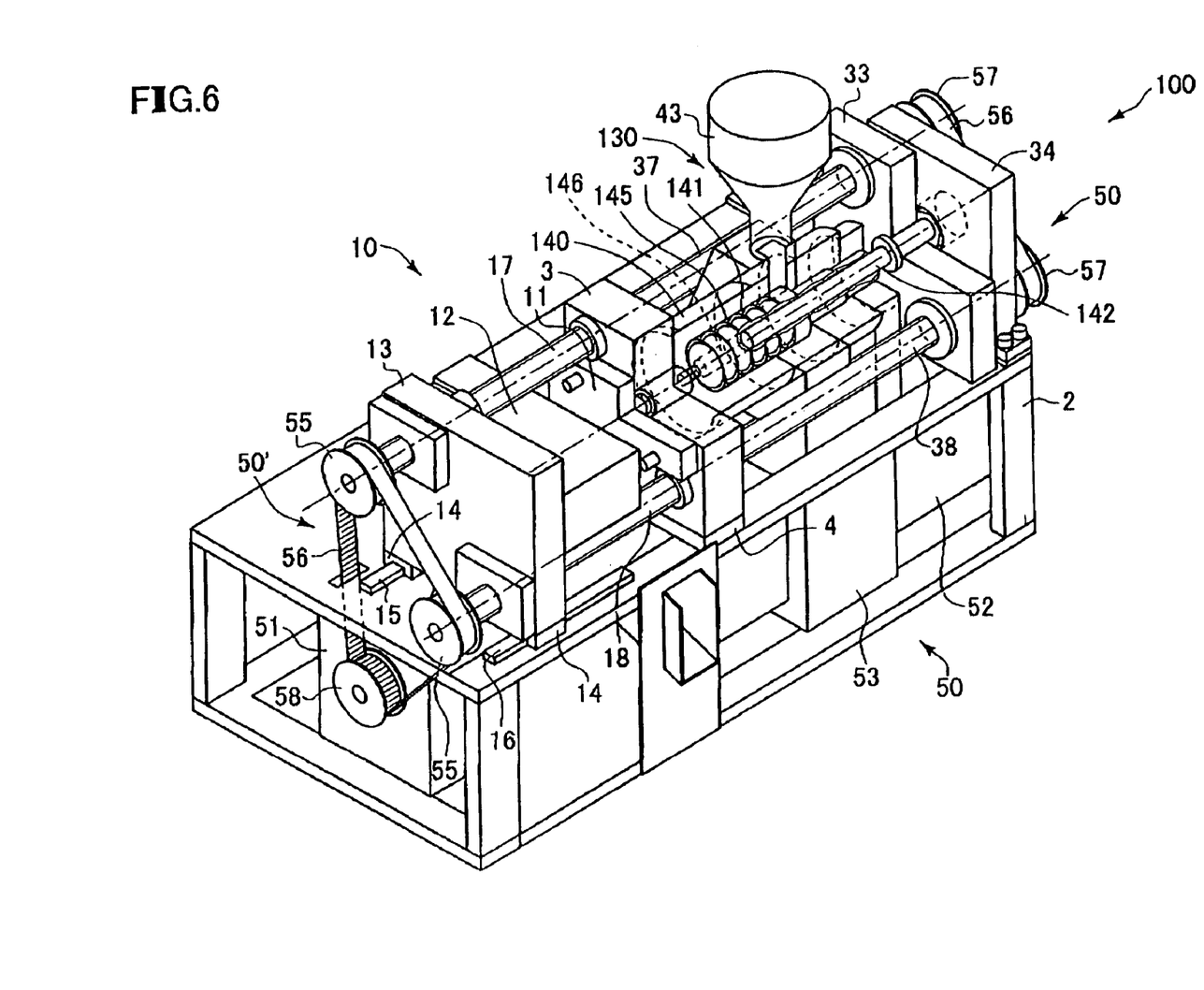
FIG. 6 is a partly notched perspective view showing a modified embodiment of the motor-driven injection molding apparatus in FIG. 1.

Next, a modified embodiment of the motor-driven injection molding apparatus 1 is shown in FIG. 6. In this case, the same reference numerals are attached to the same structures and mechanisms as those of the motor-driven injection molding apparatus 1, and a description thereof will be omitted. In an injection mechanism portion 130 of a motor-driven injection molding apparatus 100, a screw 145 for mixing the molded material is formed in a cylinder 141. Further, a receiving hole 146 for storing the mixed molded material is formed on a center axis of the screw 145 in a penetrating manner, and a plunger 142 is slidably fitted to the receiving hole 146 in a state of allowing the screw 145 to rotate, thereby structuring a plunger-in screw type injection mechanism portion 130. In this case, the screw 145 is driven by the motor 53 provided in the inner portion of the frame 2.

In accordance with the motor-driven injection molding apparatus 100 having the structure mentioned above, since the molded material introduced from the hopper 43 is molten by a heater 140 while being mixed by the screw 145 within the cylinder 141, the material is uniformly and efficiently molten. Further, the molten material (resin) is stored in the receiving hole 146 formed in a leading end of the screw 145 while moving backward the plunger 142, and the molten resin in the receiving hole 146 is injected into the metal mold in accordance with a forward movement of the plunger 142. In the plunger-in screw type structure in which the screw 145 is rotated at a fixed position and the plunger 142 moves forward in the inner portion thereof, the plunger 142 moves forward and backward via the injection side movable plate 33 mentioned above.

Figure 7:
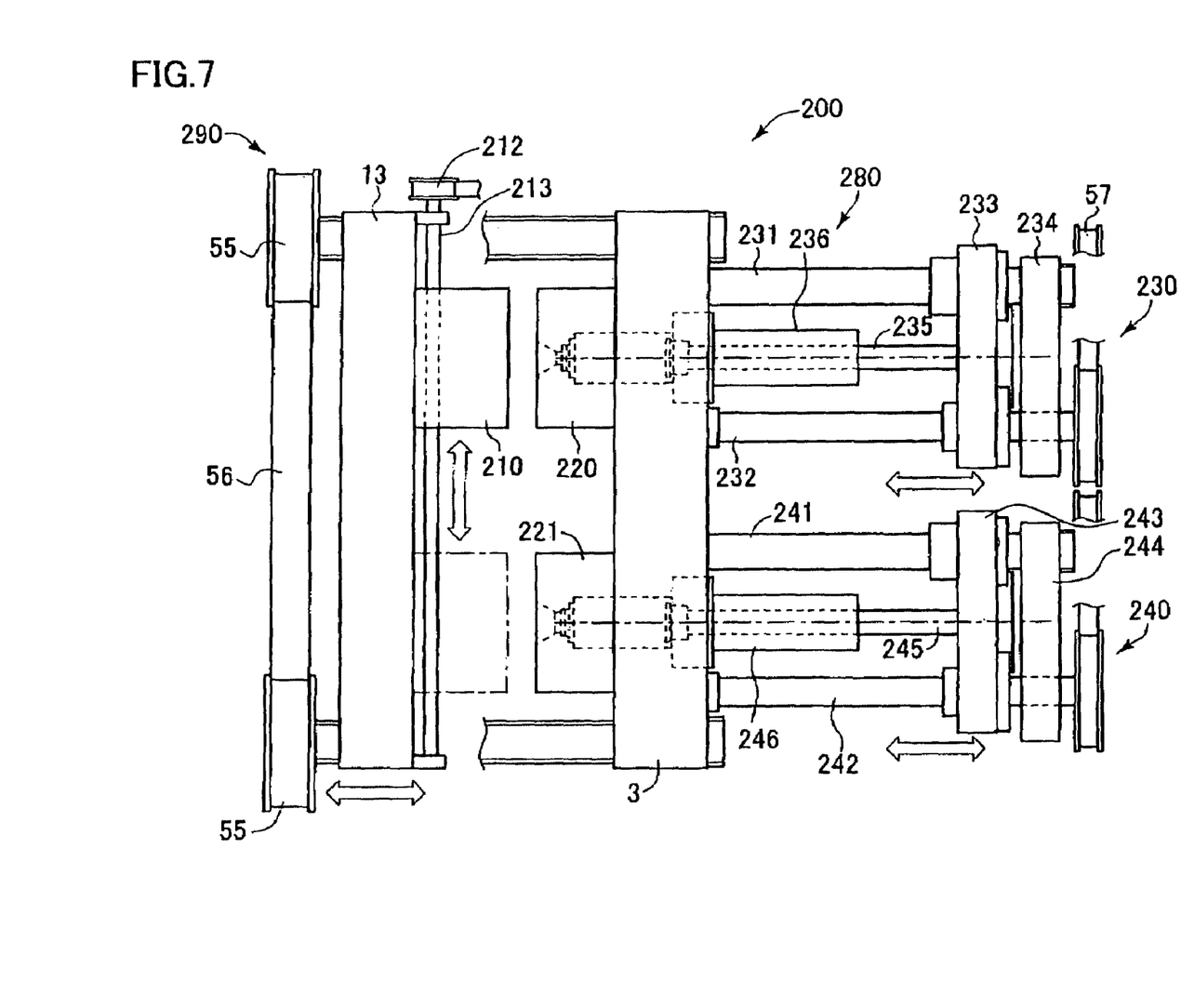
FIG. 7 is a partly plan view of a motor-driven injection molding apparatus which can carry out a two-color molding.

FIG. 7 shows a motor-driven injection molding apparatus 200 capable of carrying out a so-called two-color molding, provided with two sets of injection mechanism portions 30 of the motor-driven injection molding apparatus 1 in FIG. 1. In this case, the same reference numerals are attached to the same structures and mechanisms as those of the motor-driven injection molding apparatus 1, and a description thereof will be omitted. The apparatus 200 is structured such that in an opening and closing mechanism portion 290, two stationary metal molds, that is, a primary side stationary metal mold 220 and a secondary side stationary metal mold 221 are mounted to the center fixed plate 3 for the two-color molding. On the other hand, one movable metal mold 210 is mounted to the movable mold plate 13, and the movable metal mold 210 can be slid by a metal mold moving ball screw 213 arranged in a perpendicular direction to the moving direction (the axial direction) of the movable plate 13, in the direction thereof, and can be clamped to each of the two stationary metal molds 220 and 221 in accordance with this sliding motion.

The metal mold moving ball screw 213 is rotated via a metal mold moving pulley 212 by a motor (not shown) for exclusive use of the metal mold moving ball screw, and the movable metal mold 210 moves between a first position opposing to the primary side stationary metal mold 220 and a second position opposing to the secondary side stationary metal mold 221.

On the other hand, the injection mechanism portion 280 is provided with a primary side injection unit 230 for injecting the molded material (the molten resin) to the primary side stationary metal mold 220, and a secondary side injection unit 240 for injecting the molded material to the secondary side stationary metal mold 221, and both the units are driven by the same structure and mechanism. Both the units 230 and 240 have injection side fixed plates 234 and 244 provided in end portions, injection side ball screws 232 and 242 every two provided on respective opposing corners, tie bars 231 and 241 respectively provided on opposing corners crossing thereto, and injection side movable plates 233 and 243 respectively moving along the tie bars 231 and 241 in correspondence to the rotation of the injection side ball screws 232 and 242. Further, plungers 235 and 245 are assembled in the movable plates 233 and 243, and the plungers 235 and 245 move in an axial direction within cylinders 236 and 246 storing the molten resin of the molded material. Further, the plungers 235 and 245 are selectively moved forward, whereby the molten resin is selectively injected to either the primary or secondary stationary metal molds.

A description will be given below of an operation of the motor-driven injection molding apparatus 200 with reference to FIG. 8. In this case, each of the opening and closing mechanism and the injection mechanism is driven by the same mechanism as that in the motor-driven injection molding apparatus 1. First, as shown in (a) of FIG. 8, the primary side stationary metal mold 220 and the movable metal mold 210 are clamped. The finish of the mold clamping is detected by the load current value of the opening and closing side motor in the same manner as the motor-driven injection molding apparatus 1. Thereafter, the molten resin is injected to the primary side from the primary side injection unit 230 on the basis of the movement of the injection side movable plate 233. The finish of injection is defined by the sensor for detecting the charging state of the molten resin into the cavity as mentioned above. When a fixed keeping time has passed after injection, the injection side movable plate 233 and the movable mold plate 13 are moved in the opening direction as shown in (b) of FIG. 8.

Figure 8:
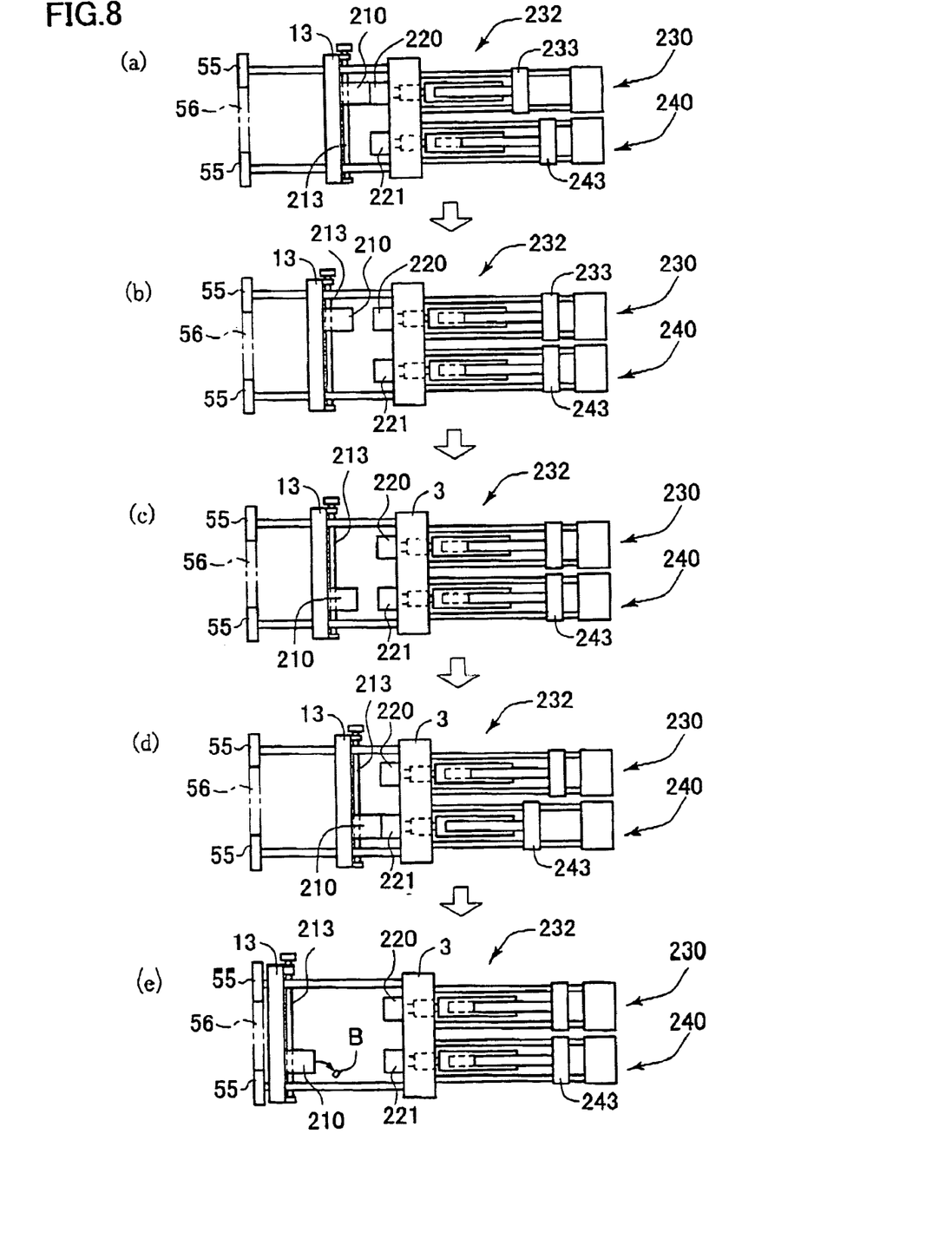
FIG. 8 is a view explaining an operation of the two-color molding of the motor-driven injection molding apparatus in FIG. 7.

From a state shown in (b) of FIG. 8, the metal mold moving ball screw 213 is rotated, and the movable metal mold 210 moves close to the secondary side ((c) of FIG. 8). Then, the movable metal mold 210 which have moved to the secondary side moves close to the center fixed plate 3 together with the opening and closing side movable plate 13, thereby is set to be in a mold clamping state. This state is also detected by the motor load current value in the same manner as the primary side. Thereafter, as shown in (d) of FIG. 8, the molten resin is injected to the secondary side from the secondary side injection unit 240, on the basis of the movement of the injection side movable plate 243. When a fixed keeping time has passed after the same sensor as that of the primary side detects the finish of injection, the injection side movable plate 243 and the movable mold plate 13 moves in the opening direction as shown in (e) of FIG. 8. Then, the two-color molded product B can be collected in accordance with an operation of an air cylinder (not shown).

In this case, the injection mechanism portion 280 of the motor-driven injection molding apparatus 200 is structured such that in two sets of injection units, both the primary side and the secondary side are constituted by the plunger type in the motor-driven injection molding apparatus 1 in FIG. 1. However, the combination may be set to any one of a combination that one is of the plunger type and another is of the plunger-in screw type in the motor-driven injection molding apparatus 100 in FIG. 6, and a combination that both are of the plunger-in screw type.

Figure 9:
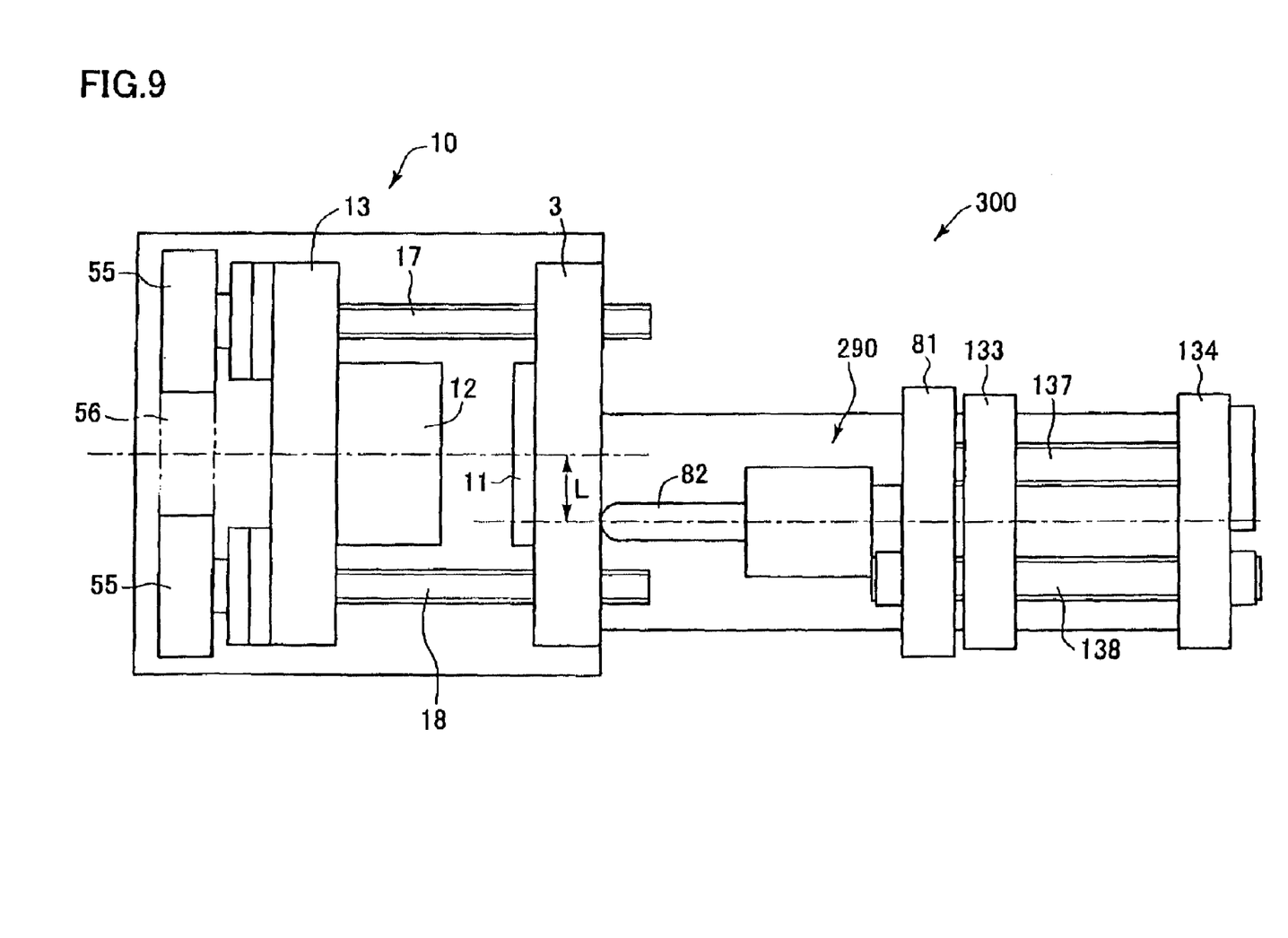
FIG. 9 is a plan view showing an embodiment in which a nozzle of an injection mechanism is offset from a center of the apparatus.

FIG. 9 shows a plan view of a further different embodiment. The mold opening and closing mechanism 10 in the motor-driven injection molding apparatus 300 is structured, in the same manner as the structure shown in FIG. 1, such that the movable mold plate 13 carries out the mold opening and closing motion with respect to the center fixed plate 3 by driving the ball screws 17 and 18 in the cantilever state, however, an injection mechanism 290 is arranged such that an injection head 82 thereof is offset by a fixed amount L with respect to a center line of the mold opening and closing mechanism 10. The injection mechanism 290 is provided with a first injection side fixed plate 81 and a second injection side fixed plate 134 which are provided so as to be fixed in position apart from each other at a predetermined interval, and an injection side movable plate 133 is guided therebetween along two tie bars (not shown) passing through one opposing corners in the same manner as the aspect shown in FIG. 1, and is driven by two ball screws 137 and 138 passing through another opposing corners so as to be screwed.

Both end portions of the ball screws 137 and 138 and the tie bars (not shown) are supported by the first and second injection side fixed plates 81 and 134, and an injection operation member (an extruding member) such as a plunger or the like fixed to the injection side movable plate 133 injects the molten resin from a leading end of the injection head 82 into a cavity formed by the mold clamping state between the stationary mold 11 and the movable mold 12 via the center side fixed plate 3, in accordance with the forward movement of the injection side movable plate 133.

A runner corresponding to a passage of the molten resin is formed in the stationary mold 11, however, in the case that the cavity is formed in an elongated shape in a plan view (in a direction L in FIG. 9), a tendency is recognized that a resin molded product having a good quality can be obtained by a matter that the molten resin inflows from one side (one end side) in a longitudinal direction of the cavity and flows toward an opposite side (another end side) and the cavity is finally filled with the molten resin, rather than a matter that the molten resin is supplied from the center of the cavity so as to flow toward right and left sides of the cavity.

In this case, if the injection head 82 is positioned in the center of the cavity (a center line of the injection head 82 is aligned with a center line of the mold opening and closing mechanism 10), the runner to be formed in the stationary mold 11 or the like becomes long (it is necessary to elongate from the center of the cavity to one end portion). On the contrary, if the injection head 82 is previously positioned close to one end side of the elongated cavity, that is, arranged in an offset manner, a forming distance of the runner can be made short, it is easy to manufacture the metal mold, and it is possible to make the structure of the runner simple.

Figure 10:
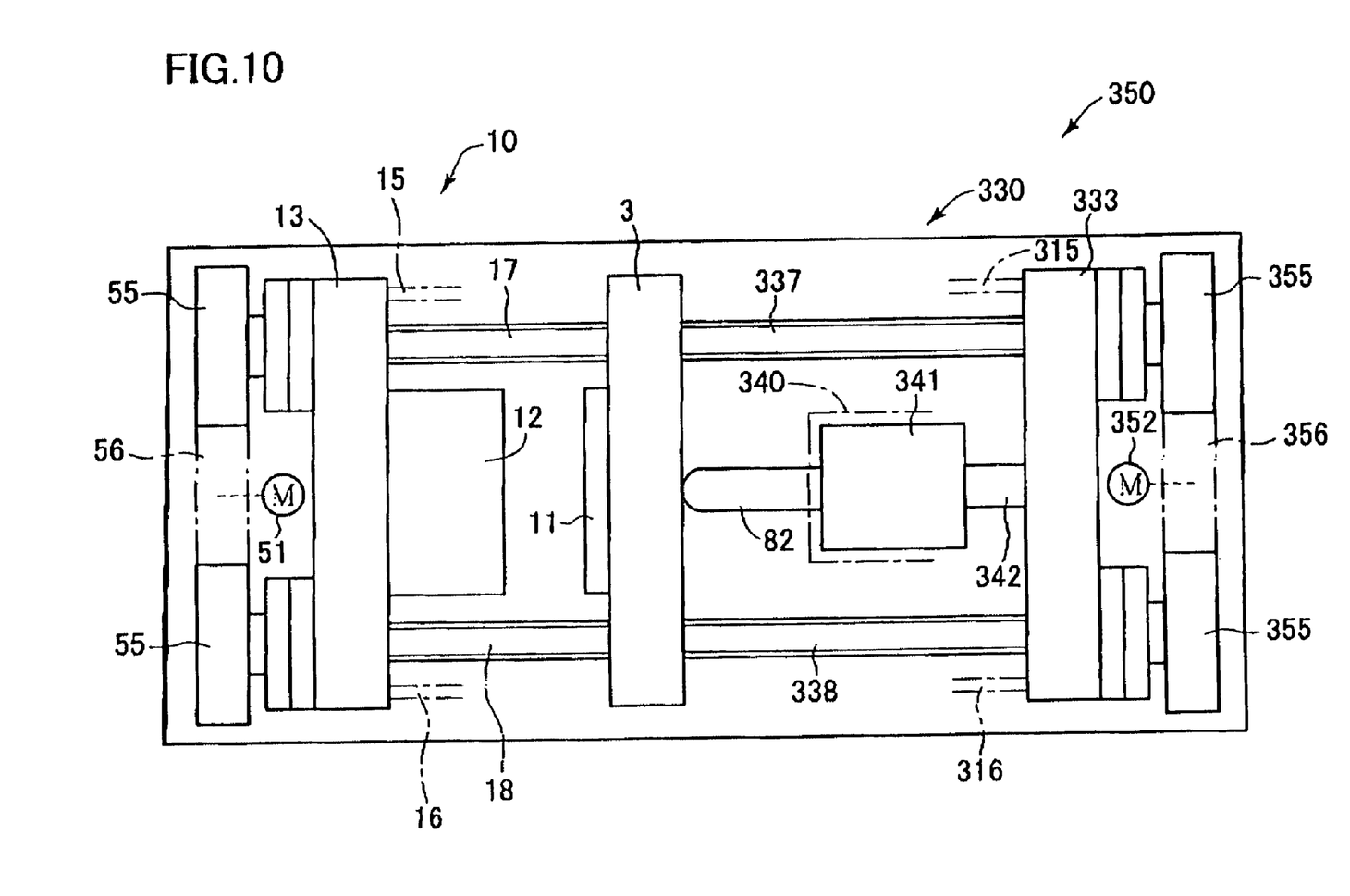
FIG. 10 is a plan view showing an embodiment in which the structure in FIG. 1 is further simplified.

FIG. 10 shows a further different embodiment. In a motor-driven injection molding apparatus 350 in accordance with this embodiment, an injection mechanism 330 employs the same structure as the structure of the mold opening and closing mechanism 10, that is, the structure in which the lower portion of the movable mold plate 13 is supported by the rails 15 and 16 of the slide guide, and the movable mold plate 13 is moved by two ball screws 17 and 18 in the cantilever state (extending through the opposing corners of the movable mold plate 13). In other words, an injection side movable plate 333 is arranged such that a bearing unit (FIGS. 1 and 3) fixed to a lower portion of the injection side movable plate 333 approaches to and deviates from the center fixed plate 3 by a slide guide sliding on linear rails 315 and 316 formed on the frame. There is no tie bar (no guide bar) for guiding the movable plate 333.

Further, two ball screws 337 and 338 extends from the center fixed plate 3 toward the injection mechanism 330, and the ball screws 337 and 338 pass through the plate 333 in such a manner as to be screwed with the injection side movable plate 333 at two points on the opposing corners. Each of the ball screws 337 and 338 is structured such that each end portion is set in a cantilever state without being supported by the end plate, and pulleys 355 and 355 are mounted to the cantilever end portions. A timing belt 356 wound around the pulleys 355 and 355 is driven by the injection side motor 352. Accordingly, the ball screws 337 and 338 are rotated in the same direction at the same speed, and move the injection side movable plate 333. A plunger 342 is forward moved by the injection side movable plate 333 for injecting the resin.

As mentioned above, the tie bar and the end plate are abolished in both the mold opening and closing mechanism 10 and the injection mechanism 330 side, and the movable mold plate 13 and the injection side movable plate 333 are moved by rotating the ball screws in the cantilever state, whereby the number of the parts can be reduced, and the structure of the apparatus becomes particularly simple. Further, the apparatus can be structured simple, and it is possible to obtain a great effect in simplification and compact size.

What is claimed is:

1. A motor-driven injection molding apparatus comprising:
   a frame having an upper surface;
   a mold comprising:
   (a) a stationary mold;
   (b) a movable mold having a lower portion disposed opposite the stationary mold; and
   (c) a cavity defined by the stationary mold and the movable mold when the stationary mold and movable mold are adjacent one another during a mold clamping state;
   a center fixed plate supporting the stationary mold;
   a movable mold plate having a lower portion with two sides, and an upper edge having a projection extending therefrom, said movable mold plate disposed so as to support the movable mold, movably arranged so as to enable the movable mold and movable mold plate to approach and deviate from said center fixed plate;
   one or more bearing units affixed to each side of the lower portion of the movable mold plate;
   a slide guide disposed so as to receive the lower portion of the movable mold plate, and slidably quide said movable mold plate in approaching and deviating directions from the stationary mold and the center fixed plate, said slide guide comprising:
   (a) two linear rails disposed parallel to each other on the upper surface of the frame in a moving direction of the movable mold plate, each of said linear rails having an upper ball groove and a lower ball groove; and
   (b) one or more bearing units comprised of a plurality of ball bearings and one or more ball bearing holders, each of said bearing units being affixed to each side of the lower portion of the movable mold plate and disposed adjacent to the linear rails so as to slide relative thereto, the plurality of ball bearings being movably disposed within the ball bearing holders so as to allow the ball bearings to roll along the upper ball grooves and the lower ball grooves of the linear rails;
   two ball screws operable to open and close the mold, said ball screws disposed within the motor-driven injection molding apparatus so as to extend from said center fixed plate toward said movable mold plate, and engage with said movable mold plate at two points on opposing corners of the movable mold plate;
   an electric side motor in movable connection with the two ball screws, operable so to open and close the mold by rotating said ball screws in both forward and backward directions, thereby moving said movable mold plate toward and away from said center fixed plate; and
   a motor-driven injection molding mechanism having:
   a plunger in flowable connection with the cavity defined by the movable mold and the stationary mold, through an orifice disposed through the center fixed plate; and
   an electric injection side motor in movable connection with the plunger, operable to move the plunger toward and away from the center fixed plate, the electric injection side motor being disposed opposite said movable mold plate with respect to said center fixed plate, and operable to drive molten resin into the cavity during the mold clamping state by forcing the plunger toward the cavity;
   wherein the projection on the movable mold plate is diagonally penetrated by one of the two ball screws.

2. The motor-driven injection molding apparatus of claim 1, wherein said injection molding apparatus further comprises:
   an injection side movable plate arranged so as to freely approach to and deviate from said center fixed plate or another fixed plate, and disposed so as to support the plunger;
   a guide mechanism for guiding the injection side movable plate during approach and deviation therefrom from the mold; and
   an injecting ball screw having a first end and a protruding end extending from said center fixed plate or the another fixed plate to a side of said injection side movable plate, in screwable connection with said injection side movable plate at the first end, and in drivable connection with the electric injection side motor at the protruding portion;
   wherein the electric injection side motor is operable to rotate said injecting ball screw in both forward and backward directions, so as to cause the injection side movable plate to approach and deviate from said center fixed plate, thereby driving the molten resin into the cavity via said plunger.

3. The motor-driven injection molding apparatus of claim 2, wherein the portion of the injection ball screw protruding from the injection side movable plate is supported by an injection side fixed plate, and the rotation driving force of said electric injection side motor is transmitted to said protruding portion of the injection ball screw so as to rotate said injection ball screw.

* * * * *